United States Patent [19]
Kober

[11] 3,887,610
[45] June 3, 1975

[54] EMULSION POLYMERIZATION OF ETHYLENE WITH CHAIN TRANSFER AGENTS TO FORM COPOLYMERS

[75] Inventor: Alfred E. Kober, Daytona Beach, Fla.

[73] Assignee: Exxon Research and Engineering Company, Linden, N.J.

[22] Filed: Dec. 9, 1971

[21] Appl. No.: 206,505

[52] U.S. Cl.............. 260/491; 252/56 R; 260/485 R; 260/486 R; 260/488 H
[51] Int. Cl............................................. C07c 69/12
[58] Field of Search.................. 260/486, 488 J, 491

[56] References Cited
OTHER PUBLICATIONS
Riddle E. H., Monomeric Acrylic Esters, Reinhold Pub. Co., N.Y. 1954.

*Primary Examiner*—Lorraine A. Weinberger
*Assistant Examiner*—Paul J. Killos
*Attorney, Agent, or Firm*—D. N. Hall; Frank T. Johmann

[57] ABSTRACT

Ethylene-containing copolymers useful in oil compositions for modifying flow properties are made by free radical emulsion polymerization using as a molecular weight modifying agent chain transfer agents such as halo-alkanes or hydrocarbyl mercaptans.

5 Claims, No Drawings

EMULSION POLYMERIZATION OF ETHYLENE WITH CHAIN TRANSFER AGENTS TO FORM COPOLYMERS

BACKGROUND OF THE INVENTION

1. Field of the Invention

This invention relates to a process for preparing ethylene derived copolymers in the presence of a chain transfer agent which controls the properties of the copolymers produced and thus makes them useful for improving the flow properties of oil compositions.

2. Description of the Prior Art

It is well-known that the flow properties of oils can be improved by incorporating in them polymeric additives. Often such polymers are copolymers derived from ethylene and an ethylenically unsaturated material such as vinyl or acrylate esters and generally they are prepared by solution polymerization (see, for example, U.S. Pat. No. 3,048,479). Initially, such polymers have usually been made with number average molecular weights ranging from 1000 to 3000.

It has now become apparent that higher molecular weights may be required for efficiently modifying the flow properties of residual and crude oils as well as those of some recalcitrant distillate oils. (See, for example, U.S. Pat. No. 3,567,639).

Known solution polymerization techniques have been difficult to adapt for large scale preparation of such high molecular weight copolymers. Viscosity increases and the exothermic nature of the reaction have led to poor heat transfer and the need to use very high ethylene pressures. For the same reason chances of local overheating and runaway reactions are increased.

It has also been found that polymers produced at relatively low polymerization temperatures are generally improved in their flow modifying properties, possibly as a result of reduced chain branching (see, for example, U.S. application Ser. No. 158,632).

Emulsion polymerization is known as a technique which can solve some of these problems and which can be used at low temperatures. Generally, though, emulsion polymerization produces polymers of very high molecular weights (see, for example, U.S. Pat. No. 2,703,794 and "Preparative Methods of Polymer Chemistry," Sorenson and Campbell, Interscience Publishers, 1961, page 158). Polymers of such high molecular weights do not usually dissolve in oils and thus cannot improve their flow properties.

It has now been found that certain hydrocarbyl mercaptans and halo-alkanes can be used as chain transfer agents in emulsion polymerizations to control the molecular weight of the product copolymers. The use of these materials in no way diminishes the copolymer's abilities to improve the flow properties of an oil and, thus, allows the use of emulsion polymerization techniques to make flow improving additives.

It has also been found that this technique can be used to prepare the low molecular weight copolymers (e.g., 1000 to 3000) that were first used as flow improvers. This is a decided advantage since the same equipment and techniques can now be used to prepare copolymers of widely varying molecular weights.

SUMMARY OF THE INVENTION

It has been found that ethylene derived copolymers useful as oil flow improvers can be prepared by a process combining emulsion polymerization techniques with the use of certain chain transfer agents such as hydrocarbyl mercaptans and halo-alkanes. The chain transfer agents modify the copolymer's molecular weight while not diminishing the ethylene content of the copolymers. Preferred comonomers for use in such polymerization systems are unsaturated carboxylic acid esters such as vinyl or acrylate esters.

DETAILED DESCRIPTION OF THE INVENTION

The process of this invention comprises forming an aqueous emulsified system comprising water, a first comonomer (such as vinyl acetate), a water-soluble free radical initiator, an emulsifier and a chain transfer agent. Ethylene is introduced into the system as a gas under pressure. The system is constantly agitated and thermostated until the desired copolymer number average molecular weight, usually about 1500 to 20,000, preferably 3500 to 15,000 is reached. Then the copolymer is recovered by standard techniques.

The first comonomer used in this invention is an emulsifiable, water-insoluble, free radical polymerizable ethylenically unsaturated compound. Preferred first comonomers are selected from the group consisting of

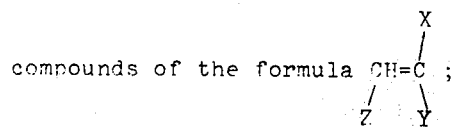

wherein Z is a hydrogen atom, —OOCR or a —COOR' group; X is a hydrogen atom, $C_1$ to $C_{18}$, preferably $C_1$ to $C_8$, hydrocarbyl, preferably alkyl, —OOCR, or a —COOR' group; Y is a —OOCR or —COOR' group; R is a hydrogen atom or a $C_1$ to $C_{18}$, preferably $C_1$ to $C_8$ hydrocarbyl, preferably alkyl group; and R' is a $C_1$ to $C_{18}$, preferably $C_1$ to $C_8$ hydrocarbyl, preferably alkyl, group.

In a preferred embodiment of this invention, the first comonomer is a vinyl alcohol carboxylic acid ester of the formula:

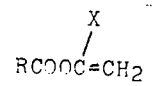

wherein R is the same as R above and X is preferably hydrogen. Specific examples of such esters are vinyl acetate, vinyl butyrate, vinyl octanoate, vinyl 1,1-dimethyl heptanoate, vinyl benzoate, vinyl laurate, 2-propenyl acetate. A preferred vinyl ester is vinyl acetate.

Another embodiment of the first comonomer is acrylate esters of the general formula:

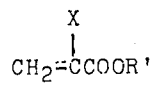

wherein X is as noted directly above, preferably hydrogen or a methyl group and R' is the same as above. Suitable examples of such acid esters are methylacrylate, 2-ethyl hexyl acrylate, phenylacrylate, methyl alpha-methacrylate, laurylacrylate, lauryl methacrylate, etc.

Another preferred form of first comonomers is unsaturated polycarboxylic acid esters of the formula:

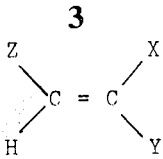

wherein at least 2 of X, Y and Z are —COOR' groups while the other is a hydrogen atom, or R'. Diesters of $C_4$ dicarboxylic acids are especially preferred. Specific examples of such compounds are dimethyl maleate, di(2-ethylhexyl) fumarate, lauryl methyl furmarate, di(octadecyl) maleate, 1,1,2 tris(carboxyethyl) ethylene, etc.

One or more of the above first comonomers can be copolymerized with ethylene, e.g. terpolymers of ethylenevinyl acetate-isobutyl acrylate can be formed.

Emulsion polymerization in the process of this invention is conducted in a reaction medium containing an aqueous phase which is a continuous phase and a dispersed phase which contains the comonomers and the chain transfer agents. The aqueous phase is essentially water.

The reaction medium contains an emulsifying agent which may be anionic, cationic or nonionic. Typically the emulsifying agent will be present in an amount sufficient to stabilize the emulsion. Generally this will be 0.001 to 0.1 moles per mole of first comonomer. Typical emulsifying agents include sodium lauryl sulfate, sodium stearate, sorbitan stearate, polyethoxy sorbitan palmitate, octadecyl benzene sulfonate, hexadecyl trimethyl ammonium bromide, etc.

A preferred emulsifying agent is sodium lauryl sulfate.

The emulsion polymerization can be initiated by conventional water-soluble free radical initiators. Generally, all those known to the art can be used. Typical initiators are percarbonates, persulfates, perphsophates, percarboxylates, etc. Redox free radical initiator combinations can also be used such as hydrogen peroxide and ferrous sulfate, sodium persulfate and sodium thiosulfate, potassium persulfate and sodium bisulfite, etc.

A preferred free radical initiator for use in this invention is sodium persulfate.

Preferably the initiator is present in the amount of about 0.001 to 0.05, preferably about 0.003 to 0.05, moles per mole of first comonomer.

The reaction process of this invention can be carried out as a batch or as a continuous operation. The emulsion polymerization reaction mixture is usually vigorously agitated and heated to a reaction temperature of about 40° to 140°C, preferably about 60° to 120°C, most preferably about 80° to 100°C at which point the temperature is generally maintained substantially constant during the course of the reaction.

The pressure of ethylene in the reaction vessel is preferably maintained at a substantially constant level throughout the reaction. Generally, the pressure of ethylene is maintained between about 50 to 500 atmospheres, preferably about 100 to 400 atmospheres, most preferably about 200 to 300 atmospheres.

The chain transfer agents used in the process of this invention may be defined as compounds which interrupt a free radical polymerization chain, terminating the growth of that chain, and usually initiating the growth of another chain (see, for example, "Textbook of Polymer Science," Billmeyer, John Wiley and Sons, N.Y., 1962, page 279).

Preferred chain transfer agents for use in the process of this invention are $C_1$ to $C_{30}$, preferably $C_1$ to $C_{18}$ hydrocarbyl, preferably alkyl, mercaptans, and $C_1$ to $C_4$, preferably $C_1$ to $C_2$ halo-alkanes, usually containing 1 to 4 halogen, preferably chlorine, atoms per molecule. Typical examples of such compounds are methyl mercaptan, ethyl mercaptan, dodecyl mercaptan and tetradecyl mercaptan, chloroform, bromoform, iodoform, carbon tetrachloride, 1,1,2-trichloroethane, etc. The chain transfer agent can be liquid or solid and should be soluble in the dispersed phase of the emulsion polymerization.

Particularly preferred chain transfer agents are dodecyl mercaptan, tertiary tetradecyl mercaptan and chloroform.

In general, the chain transfer agent is used in concentrations of about 0.005 to 0.25, preferably about 0.01 to 0.15, moles per mole of the first comonmer.

In the process of this invention, water is present in an amount sufficient to support an emulsion of the first comonomer as the dispersed phase. Generally, this amount will be between 1 and 10 parts by volume of water per part by volume of the first comonomer.

The reaction is generally carried out over a period of about 6 to 600 minutes, preferably about 60 to 240 minutes, most preferably about 90 to 180 minutes.

At the end of the reaction period, whether the reaction be carried out batchwise or continuously, the reaction mixture is cooled to 20° to 50°C and depressurized by releasing the gases from the reaction, if any, permitting the reaction vessel to attain atmospheric pressure.

After breaking of the reaction emulsion by conventional techniques, the copolymer product can be recovered by techniques such as filtration, extraction followed by water washing, evaporation or precipitation.

The process of this invention produces polymers of number average molecular weights (Mn) of about 1500 to 20,000, preferably of about 3,500 to 15,000 as measured by vapor pressure osmometry. In the examples below, as osmometer supplied by the Mechrolab Inc., of 162 Linda Vista Avenue, Mountainview, California, was used.

The copolymers produced by this invention can also be characterized by the amount of first comonomer-derived units incorporated in them. Often, the extent of incorporation can be calculated from the elemental composition of the copolymer. In other cases, techniques such as infrared or nuclear magnetic resonance can be used.

The copolymers produced by the process of this invention contain about 4 to 15, preferably about 4 to 10 moles of ethylene per mole of first comonomer. When the first comonomer is vinyl acetate, and no termonomer is used, this means that copolymer contains about 3.5 to 45 weight percent vinyl acetate derived units.

The flow properties of either distillate or residual fuel oils can be improved by incorporating into the oil a flow improving amount of the copolymer produced by the process of this invention.

A residual fuel oil can be defined as that portion of a crude oil which remains in a processing distillation unit after the distillate has been withdrawn. A residual oil in the terms of this invention can also include a blend of such a residual fuel oil as above-defined with a distillate fuel oil fraction.

Distillate fuel oils can be defined as those petroleum products having an atmospheric boiling range of between about 120°C and 400°C as determined by the ASTM D-86 distillation. Such distillate oils include gas oil, kerosene and No. 1 or 2 heating oils.

Also included in the oils whose flow properties may be improved by treatment with the copolymers of this invention are crude oils. These crude oils may be in their naturally occurring reservoirs or in pipelines, storage tanks, transport tanks, refinery processing units, etc.

When used in distillate or residual fuel oils to improve their flow properties, the copolymers produced by this invention are mixed with such oils in a flow-improving amount, typically about 0.001 to 1.0, preferably about 0.002 to 0.5, most preferably about 0.05 to 0.25 parts per hundred parts of oil by weight. The improvement in the flow properties of such treated distillate fuel oils is preferably determined by standard tests such as the Enjay Programmed Fluidity Test (PFT) or the Cold Flow Filter Plugging Point Test (CFPPT) which are described below. The flow properties of such a treated residual fuel oil are usually determined by the Upper-Lower Pour Point Test (U/LPPT) described below.

The invention is further illustrated in the following examples.

DESCRIPTION OF EXAMPLES

Example 1A

A mixture of 200 g. (2.5 m) of vinyl acetate and 12 g. (0.06 m) of dodecyl mercaptan was charged into an autoclave equipped with a stirrer, pressure and temperature sensing devices, and connected to a source of compressed ethylene. The autoclave contained an internal cooling coil. Five hundred mls. of distilled water containing in solution, 2 g. (0.0074 m) of potassium persulfate as an initiator, and 2 g. of sodium lauryl sulfate (0.007 m) as an emulsifying agent were also charged to the reactor. The system was then deaerated by alternately putting it under a pressure of about 10 mm of mercury and pressuring it to at least 200 atmospheres of ethylene for 3 cycles. Ethylene was then fed into the autoclave at 340 atmospheres. The autoclave contents were very rapidly stirred and its contents heated to a reaction temperature of 80°C. The reaction was allowed to proceed at 80°C, for 150 minutes while being very rapidly stirred. Ethylene was continually fed to the autoclave at the above-noted pressure. The reaction vessel was then vented of excess ethylene to the atmosphere and allowed to cool. The cool reaction mixture was drained into 750 mls. of a 5% aqueous sodium chloride solution to break the emulsion. This mixture was then heated to about 70°C, while being stirred. The stirring was then stopped and the coagulated polymer product allowed to separate. After aqueous sodium chloride solution was decanted from the polymer, the polymer product was washed with 750 mls. of 10% aqueous sodium chloride solution by stirring it in contact with the solution for 5 minutes at a temperature of about 70°C. The polymer was then recovered by decantation and dissolved in hexane. The hexane solution of polymer was washed and dried over anhydrous magnesium sulfate and then stripped of hexane under nitrogen.

To obtain samples for molecular weight determinations, one of two further work-up procedures was used. Liquid and semi-solid copolymers of relatively low molecular weight were dissolved in benzene and precipitated by slowly adding the benzene solution to at least three volumes of methanol. The precipitate was collected by decantation or filteration and dried as above (Procedure a).

Relatively high molecular weight solid copolymers were dissolved in a volatile solvent such as benzene which was then cast to form a film. After the solvent had evaporated, the copolymer film was cut into small pieces and these were slurried with methanol. The pieces were then recovered and dried as above (Procedure b).

The procedure followed in each Example is noted in Table I.

Example 1B

The same procedure used in Example 1A was used except that the reaction was carried out at a temperature of 60°F and dodecyl mercaptan was omitted.

Examples 2A, 5A and 6

The same procedure used in Example 1A was used except that the amounts of dodecyl mercaptan and ethylene pressures were varied as shown in Table I.

Examples 2B and 5B

The same procedures used in Example 1B were used except that a temperature of 80°C was used and the ethylene pressures were varied as shown in Table I.

Examples 3 and 4

The same procedure as used in Example 1A was used except that chloroform was substituted for dodecyl mercaptan in the amount shown and ethylene pressures were varied as shown in Table I.

TABLE I

| | EXAMPLES | | | | | | | | |
|---|---|---|---|---|---|---|---|---|---|
| | 1A | 1B | 2A | 2B | 3 | 4 | 5A | 5B | 6 |
| Process Conditions | | | | | | | | | |
| Ethylene Pressure, Atm. | 340 | 340 | 205 | 205 | 205 | 205 | 135 | 135 | 135 |
| Temperature | 80 | 60 | 80 | 80 | 80 | 80 | 80 | 80 | 80 |
| $C_{12}H_{25}SH$, gm | 12 | — | 12 | — | — | — | 12 | — | 40 |
| $CHCl_3$, gm | — | — | — | — | 22 | 47 | — | — | — |
| Product Properties | | | | | | | | | |
| Vinyl Acetate, wt% | 29 | 26 | 31 | 42 | 32 | 41 | 42 | 43 | 44 |
| Mol. Wt. | 12600[3] | 20500[3] | 7400[3] | insol.[1] | 3230[4] | 1610[4] | 6007[4] | insol.[1] | 2110[4] |

TABLE 1—Continued

| | Base Oil Properties | EXAMPLES | | | | | | | | |
|---|---|---|---|---|---|---|---|---|---|---|
| | | 1A | 1B | 2A | 2B | 3 | 4 | 5A | 5B | 6 |
| Performance in Oil | | | | | | | | | | |
| Resid. Fuel 1 (U/LPPT) | 38/38°C | 32/13 | 32/21 | 32/13 | 38/38 | 32/10 | 35/38 | 21/7 | 38/38 | 35/38 |
| Dist. Fuel 2 (PFT) | 0% | 42 | 26 | 49 | insol.[2] | 100 | 100 | 59 | insol.[2] | 100 |
| Dist. Fuel 3 (CFPPT) | −3°C | — | — | −8 | insol.[2] | −10 | −10 | −8 | insol.[2] | −9 |

[1]Polymer insoluble in solvent used in molecular weight determination; thus of very high molecular weight
[2]Polymer insoluble in test oil, thus ineffective.
[3]Purified by procedure b, as described in Example 1A
[4]Purified by procedure a as described in Example 1A Examination of the data summarized in Table I shows that the process of the present invention produces copolymers of reduced molecular weight when compared to copolymers made by a process omitting the chain transfer agent. Thus copolymer 1A is of about half the molecular weight of comparative copolymer 1B. The other comparative copolymers of Examples 2B and 5B were of too high a molecular weight to be measured by osmometry.

As will be seen from the data discussed below, the differences between the copolymers of Examples 1A, 2A, 3, 4, 5A and 6 and the comparative copolymers of Examples 1B, 2B, and 5B markedly affect their performance as flow improves.

EVALUATION OF COPOLYMERS AS FLOW IMPROVERS

The effectiveness of the copolymers produced in Examples 1–6 as flow improvers for residual oils was demonstrated by blending the copolymers with a residual oil (Fuel 1) obtained from the Brega field of Libya, and having a pour point of +43°C., a kinematic viscosity of 50° and 325–52 cs, and an initial boiling point of 340°C. In each case 0.15 parts by weight of the copolymers was blended with 100 parts of the oil.

The copolymers made in Examples 3, 4, 5A and 6 were also evaluated in the middle distillate fuels, Fuel 2 and Fuel 3.

Fuel 2 was a heating oil having an initial boiling point of 195°C., a 10% by volume boiling point of 228°C., a 90% by volume boiling point of 302°C., a final boiling point of 320°C., a cloud point of −17°C., a pour point of 188°C., and a wax content of 3.6%. Fuel 3 was a European -originated middle distillate fuel, having a 10% by volume boiling point of 195°C., a 90% by volume boiling point of 340°C., an aniline point of 73°C., a pour point of −15°C. and a cloud point of −3°C.

EVALUATION TESTS

The flow properties of residual fuel oil blends were evaluated with the Upper-Lower Pour Point Test (U/LPPT) described in ASTM D-97-66.

The flow properties of distillate fuel oil blends were measured by the Enjoy Program Fluidity Test (PFT). This test is carried out in an hour-glass shaped device having upper and lower chambers separated by a partition defining a capillary orifice of 0.1 inch diameter. Forty milliliters of oil with 0.1% additive is poured into the lower chamber. The device is then chilled from a temperature of 5°C above the oil's cloud point at a rate of 2°C per hour to a temperature of 5°C below the oil's cloud point. Upon inversion of the device, the cloudy oil is allowed to flow by gravity into the empty lower chamber. The volume precent of the oil passing from the upper to the lower chamber through the orifice in three minutes is noted.

If the wax precipitated from the oil is of large crystal size, it blocks the orifice, slows the flow of oil, and a relatively small volume of oil is found to pass into the lower chamber. On the other hand, small crystals do not block the orifice. The oil flows well and the volume percent of oil passing into the lower chamber is high.

A second test used to evaluate distillate blend flow properties was the "Cold Filter Plugging Point Test" (CFPPT). This test is described in detail in the "Journal of the Institute of Petroleum", Vol. 52, No. 510, June, 1966, pp. 173–185. In brief, the CFPPT is carried out with a 45 ml. sample of oil containing 0.025% additive which is cooled in a bath maintained at about −35°C. At every 1°C drop in temperature starting from 2°C above the oil's cloud point, the oil is tested with a device consisting of a pipette whose lower end is attached to an inverted funnel. Stretched across the mouth of the funnel is a 350 mesh screen having an area of approximately 0.45 square inches. A vacuum of 7 inches of water is applied to the upper end of the pipette while the screen is immersed in the oil sample. Due to the vacuum, oil is drawn through the screen into the pipette to a mark indicating 20 mls. of oil. The test is repeated until the oil fails to fill the pipette at a given temperature due to clogging of the screen with wax crystals. The results of the test are reported in "Operability Limits" or Cold Filter Plugging Point which is the temperature in °C at which the oil fails to fill the pipette in the prescribed time.

EVALUATION RESULTS

The results of oil flow evaluation tests comparing the performance of the copolymers of Examples 1A, 2A, 3, 4, 5A and 6 with those of Examples 1B, 2B and 5B are summarized in Table I. As can be seen, the copolymers of Examples 1A, 2A, 3 and 5A significantly lower both the upper and lower pour points of the residual fuel while those of Example 1B, 2B and 5B are of little or no significant effect.

Similarly in a distillate fuel (Fuel 2) the copolymers of Examples 1A, 2A, 3, 4, 5A and 6 were all more effective in the PFT than those of Examples 1B, 2B and 5B. Indeed, the copolymers of the latter two examples were insoluble in the test oil and thus totally ineffective.

Examples 3, 4 and 6 demonstrate that this process of this invention can be used to prepare effective low molecular weight copolymers as well as higher molecular weight ones.

The copolymers of Examples 2A, 3, 4, 5A and 6 were also effective in Fuel 3 when tested in the CFPP test described above. In contrast, the copolymers of Examples 2B and 5B were insoluble in the test fuel and thus totally ineffective.

These data clearly show that the process of this invention allows the preparation of copolymers of markedly improved effectiveness as flow improvers for oils.

Example 7

The same procedure used in Example 1A was used except that the vinyl acetate was replaced with 100 ml of 2-ethylhexyl acrylate and 20 ml of dodecyl mercaptan was used. The polymer obtained had an acrylate ester content of 55 wt. % and a molecular weight of 6692.

It should be noted that this invention is not limited to the specific examples presented above by way of illustration. The scope of the invention is limited only by the appended claims.

What is claimed is:

1. An emulsion polymerization process for preparing an oil soluble copolymer useful for improving the flow properties of petroleum fuel oils, said copolymer consisting essentially of about 4 to 15 molar proportions of ethylene per molar proportion of vinyl acetate, said copolymer having a number average molecular weight of about 3500 to 15,000, which process comprises forming an aqueous emulsified system comprising water, vinyl acetate, a water soluble free radical initiator, an emulsifier and a chain transfer agent, introducing ethylene and copolymerizing said ethylene and said vinyl acetate for about 6 to 600 minutes under ethylene pressure of 50 to 500 atomospheres, at a temperature in the range of about 60° to 120°C., and recovering said copolymer, wherein said chain transfer agent is selected from the group consisting of $C_1$ to $C_{18}$ alkyl mercaptan and $C_1$ to $C_4$ chloroalkanes containing up to 4 chlorine atoms per molecule, wherein said initiator is present in an amount of 0.001 to 0.05 mole per mole of said vinyl acetate, wherein said chain transfer agent is present in the amount of 0.005 to 0.25 mole per mole of said vinyl acetate, wherein the aqueous phase is continuous, and wherein said vinyl acetate and said chain transfer agents are in the dispersed phase.

2. A process according to claim 1, wherein the chain transfer agent is present in the amount of about 0.01 to 0.15 mole per mole of vinyl acetate, and the chain transfer agent is dodecyl mercaptan or chloroform.

3. A process according to claim 2, wherein the ethylene pressure is about 135 to 350 atmospheres and the emulsion polymerization temperature is about 80° to 100°c.

4. A process according to claim 3, wherein said chain transfer agent is dodecyl mercaptan.

5. A process according to claim 3, wherein said chain transfer agent is chloroform.

* * * * *